US009614462B2

(12) United States Patent
Post

(10) Patent No.: US 9,614,462 B2
(45) Date of Patent: Apr. 4, 2017

(54) RIPPLED DISC ELECTROSTATIC GENERATOR/MOTOR CONFIGURATIONS UTILIZING MAGNETIC INSULATION

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 610 days.

(21) Appl. No.: 14/171,724

(22) Filed: Feb. 3, 2014

(65) Prior Publication Data

US 2014/0184017 A1    Jul. 3, 2014

Related U.S. Application Data

(63) Continuation-in-part of application No. 13/609,237, filed on Sep. 10, 2012, now Pat. No. 8,643,249, which is a continuation of application No. 12/894,612, filed on Sep. 30, 2010, now Pat. No. 8,264,121, which is a continuation-in-part of application No. 11/932,329, filed on Oct. 31, 2007, now Pat. No. 7,834,513.

(60) Provisional application No. 60/971,186, filed on Sep. 10, 2007, provisional application No. 61/366,293, filed on Jul. 21, 2010, provisional application No. 61/314,467, filed on Mar. 16, 2010.

(51) Int. Cl.
*H02N 1/00*  (2006.01)
*H02N 1/08*  (2006.01)

(52) U.S. Cl.
CPC .................................. *H02N 1/08* (2013.01)

(58) Field of Classification Search
CPC ................................... H02N 1/08; H02N 1/00
USPC ................................................... 310/300, 309
See application file for complete search history.

(56) References Cited

U.S. PATENT DOCUMENTS

| | | |
|---|---|---|
| 2,194,839 A | 3/1940 | De Graaff et al. |
| 2,247,783 A | 7/1941 | Massolle |
| 2,523,689 A | 9/1950 | Felici |
| 2,781,460 A | 2/1957 | Felici |
| 2,785,320 A | 3/1957 | Morel |
| 2,818,513 A | 12/1957 | Felici et al. |
| 2,840,729 A | 6/1958 | Kreuthmeir |
| 2,860,264 A | 11/1958 | Felici et al. |
| 3,094,653 A | 6/1963 | Le May et al. |
| 3,210,643 A | 10/1965 | Else et al. |

(Continued)

FOREIGN PATENT DOCUMENTS

JP         63-136982         6/1988

OTHER PUBLICATIONS

Trump, "Electrostatic Sources of Electric Power," Electrical Engineering, pp. 525-534, (1947).

*Primary Examiner* — Thanh Lam
(74) *Attorney, Agent, or Firm* — John P. Wooldridge

(57) ABSTRACT

Electrostatic generators/motors designs are provided that generally may include a first rippled stator centered about a longitudinal axis; a second rippled stator centered about the axis, a first rippled rotor centered about the axis and located between the first rippled stator and the second rippled stator. A magnetic field having field lines about parallel with the average plane of at least one of the first rippled stator or the second rippled stator is provided with either a Halbach array configuration or a conductor array configuration.

18 Claims, 12 Drawing Sheets

(56) References Cited

U.S. PATENT DOCUMENTS

| | | | |
|---|---|---|---|
| 3,629,624 | A | 12/1971 | Staudte |
| 3,951,000 | A | 4/1976 | Ferriss et al. |
| 4,126,822 | A | 11/1978 | Wahlstrom |
| 4,225,801 | A | 9/1980 | Parker, Jr. |
| 4,546,292 | A | 10/1985 | Audren et al. |
| 4,595,852 | A | 6/1986 | Gundlach |
| 4,622,510 | A | 11/1986 | Cap |
| 4,754,185 | A | 6/1988 | Gabriel et al. |
| 4,789,802 | A | 12/1988 | Miyake |
| 4,897,592 | A | 1/1990 | Hyde |
| 5,237,234 | A | 8/1993 | Jebens et al. |
| 5,248,930 | A | 9/1993 | Taylor |
| 5,506,491 | A | 4/1996 | Ford |
| 5,705,902 | A | 1/1998 | Merrit et al. |
| 5,808,383 | A | 9/1998 | Kostov et al. |
| 5,965,968 | A | 10/1999 | Robert et al. |
| 6,353,276 | B1 | 3/2002 | Gendron |
| 6,629,503 | B2 | 10/2003 | Post |
| 6,633,217 | B2 | 10/2003 | Post |
| 6,657,344 | B2 | 12/2003 | Post |
| 6,664,880 | B2 | 12/2003 | Post |
| 6,758,146 | B2 | 7/2004 | Post |
| 6,771,002 | B2 | 8/2004 | Jones |
| 6,858,962 | B2 | 2/2005 | Post |
| 6,906,446 | B2 | 6/2005 | Post |
| 7,230,364 | B2 | 6/2007 | Odaka et al. |
| 7,478,598 | B2 | 1/2009 | Post |
| 7,834,513 | B2 | 11/2010 | Post |
| 8,264,121 | B2 | 9/2012 | Post |
| 8,643,249 | B2 | 2/2014 | Post |
| 2002/0125790 | A1* | 9/2002 | Horning ............... B81B 3/0021 310/309 |
| 2006/0214535 | A1 | 9/2006 | Salmon |
| 2009/0066298 | A1* | 3/2009 | Post ..................... H02N 1/08 322/2 A |
| 2010/0194236 | A1* | 8/2010 | Verkoglyad ............ H02N 1/08 310/308 |

\* cited by examiner

RIPPLED DISC ELECTROSTATIC GENERATOR/MOTOR CONFIGURATIONS UTILIZING MAGNETIC INSULATION

CROSS-REFERENCE TO RELATED APPLICATIONS

This is a continuation-in-part of U.S. patent application Ser. No. 13/609,237, titled "Improved Electrostatic Generator/Motor Configurations," filed Sep. 10, 2011, incorporated herein by reference, which is a continuation of U.S. patent application Ser. No. 12/894,612, titled "Improved Electrostatic Generator/Motor Configurations," filed Sep. 30, 2010, incorporated herein by reference, which is a continuation-in-part of U.S. patent application Ser. No. 11/932,329 titled "An Improved Electrostatic Generator/Motor," filed Oct. 31, 2007, incorporated herein by reference, which claims priority to U.S. Provisional Patent Application Ser. No. 60/971,186, titled "An Improved Electrostatic Generator/Motor," filed Sep. 10, 2007, incorporated herein by reference. U.S. patent application Ser. No. 12/894,612 claims the benefit of U.S. Provisional Patent Application No. 61/366,293 titled "Method for Supporting Passive Magnetic Bearing and other Elements on the Expanding Inner Surface of a Flywheel Rotor," filed Jul. 21, 2010, incorporated herein by reference. U.S. application Ser. No. 12/894,612 claims priority to U.S. Provisional No. 61/314,467 filed Mar. 15, 2010, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to electrostatic generators and motors, and more specifically, it relates to improvements in their configurations.

Description of Related Art

Early work performed by John Trump examined theoretically and experimentally a new form of electrostatic generator/motor that was especially suitable for use in a vacuum environment. Subsequent workers employed his ideas in their designs. Trump's generator/motor consisted of interleaving fan-like condenser plates, consisting of "stators" and "rotors." The stator assembly was supported on insulators, and the rotor "fans" were mounted on a rotating shaft. As the rotor rotated, the capacitance between the stator and rotor would vary between a maximum value, when the blades were directly opposite to each other, to a minimum value when the rotor blades faced the gaps between the stator blades. In many of Trump's generator/motors, "brushes" made contact with the rotor blade shaft to provide a means of electrical connection to the rotor blade assembly.

To operate Trump's devices as a generator, a potential was established between the stator and rotor by connecting them to a DC power supply through a high-resistance "charging resistor". Once the condensers reached the full electrical potential, no further charge was drawn from the power supply. However, when the rotor was spinning, the potential between stator and rotor would have an alternating current component, as a natural consequence of the time variation of the capacitance, as given by the equation:

$$V[t] = \frac{Q_0}{C[t]}, \quad [1]$$

where $Q_0$ (coulombs) is the (fixed) charge on the condenser, and $C[t]$(farads) is the capacity of the time-varying capacitor. The time-variation of capacity of an actual fan-like capacitor made up of a stationary and a rotating set of sector plates can be modeled reasonably well by the expression:

$$C[t] = C_0\left(\frac{(1 + k\cos[\omega t])}{1+k}\right), \quad k < 1, \quad [2]$$

where $C_0$ is the value of the capacity of the condenser at its maximum, and $\omega$ is the angular frequency of variation of the capacity as it cycles between its maximum and its minimum value.

Inserting Eq. 2 into Eq. 1, one can calculate the variation in potential for a given set of values for $Q_0$, $C_0$, $k$, and $\omega$. If we take $Q_0 = V_0 C[0]$ as the initial charge (at $t=0$, a time when the capacity has its maximum value), then we may plot the potential across the capacitor as a function of time (in the absence of any loads connected to its terminals. A large AC component is superposed on the DC level. It is desirable to make optimum use (both electrically and geometrically) of this driver in order to maximize the power output of the generator. As will be shown, the special rotor-stator configurations and circuits that are the subject of this disclosure represent a major improvement over the simple configurations studied by Trump and by others following him.

SUMMARY OF THE INVENTION

The invention generally provides apparatuses and methods where a magnetic field having a magnetic field component conforms to a portion of the curvature of a conductive surface.

More specifically, the invention provides apparatuses and methods where a rippled disc shaped first rotor has its center located on a central axis, and the average plane of the rotor is perpendicular to the central axis and the rotor is rotatable around the central axis. A rippled disc shaped first stator has its center located on the central axis, where the average plane of the first stator is perpendicular to the central axis and is parallel with the rotor. A rippled disc shaped second stator has its center located on the central axis, where the average plane of the second stator is perpendicular to the central axis and is parallel with the average plane of the rotor, where said rotor is located between said first stator and said second stator.

The inventions utilizes a Halbach array or a conductor array to provide a magnetic field comprising field lines that conform to the curvature of the rippled shape of the first stator and the second stator.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Embodiments of the electrostatic generator/motor of U.S. patent application Ser. No. 11/932,329 include several geometrical configurations for the variable condenser element of the generator/motor. The present invention includes new configurations for that element. These configurations have important advantages in terms of electrical performance, mechanical rigidity and simplified construction.

Figure 1:
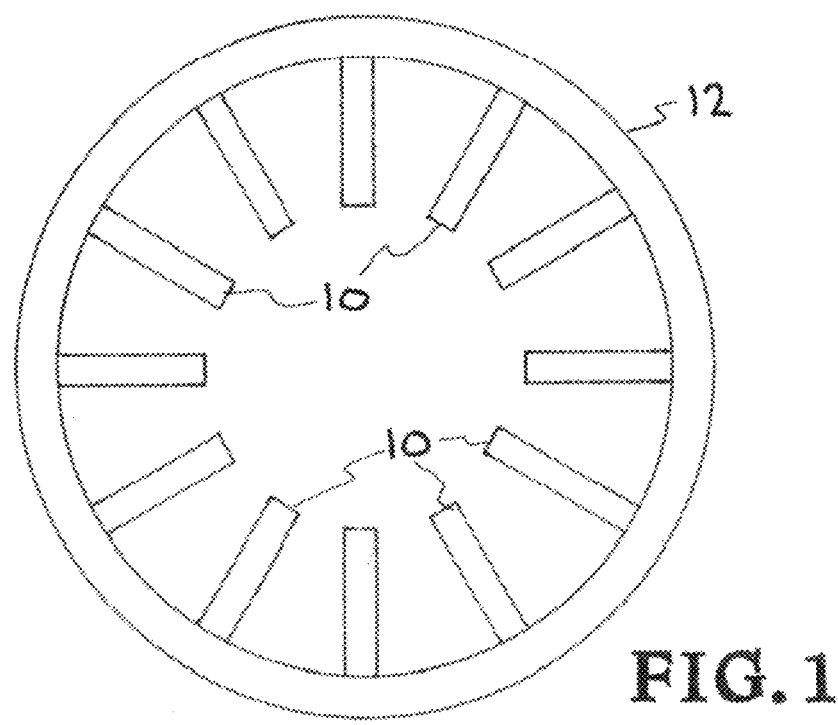
FIG. 1 shows a schematic drawing of a present rotor spoke assembly.
Figure 2:
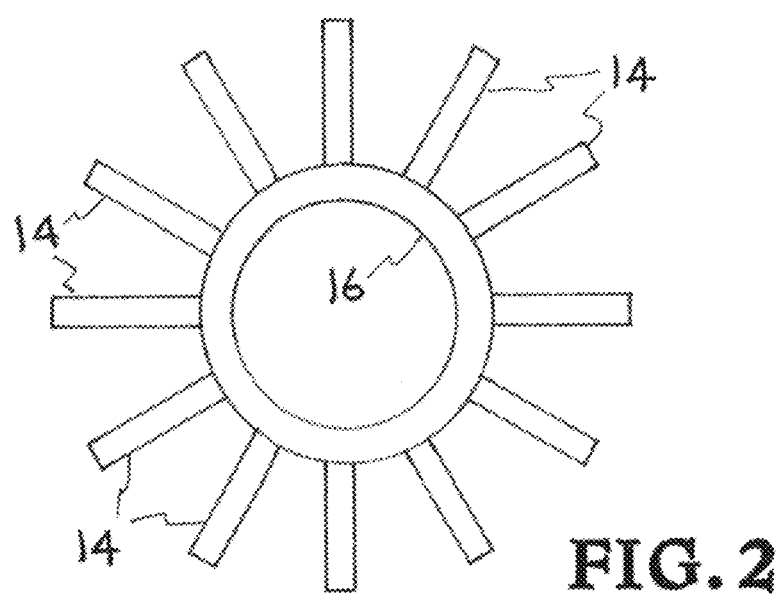
FIG. 2 shows a schematic drawing of a present stator spoke assembly.

One embodiment of the new configuration has rotor and stator elements that have a shape that increases the element's standoff voltage. Exemplary shapes are tubes or rod and exemplary cross-sections of the shapes may be circular or elliptical. The variable condenser of the generator/motor is made up of successive layers of these rods or cylinders arranged in a form resembling the spokes on a wheel. FIG. 1 depicts an exemplary rotor of the present invention and includes rotor elements, as exemplified by element 10, (which can be, e.g., rods or tubes) supported by a support structure 12. FIG. 2 depicts an exemplary stator of the present invention and includes stator elements, as exemplified by element 14, supported by a central support structure 16. Stator elements 14 can be configured, e.g., as metallic rods or tubes. A basic configuration of an electrostatic generator/motor according to the present invention begins with a stator at the bottom of the stack. As shown in FIG. 2, the stator is supported by an inner structure. The next layer above the bottom stator is a rotor having the outer ends of its rotor elements (spokes) mechanically secured by support structures on the inner surface of a cylinder, e.g. the inside surface of a flywheel rotor made of fiber composite. Such a support structure is illustrated in FIG. 1. The next layer up would be another stator, and so forth. Electrical connections can be made to each of the stationary spokes to charge them so as to either extract power when the system is in a generator mode, or to provide electrical drive power when the system is in a motor mode. In exemplary applications of the invention, all of the spokes of a given stationary layer would be charged to a given potential with stationary layers above and below that layer either grounded or charged to an opposite-sign potential. This charging pattern would eliminate spoke-to-spoke potential differences for any given stationary layer. An alternative charging pattern would be for the spokes of each stationary layer to be charged alternately positively or negatively, with the corresponding spokes of the stationary layer above and below this layer being charged alternately negatively and positively. In this way the rotating spokes pass alternately through regions with upward and downward directed electric fields. This alternating gradient action inhibits the build-up of static charges on the rotating rods, which are insulated from electrical contact with ground. In some embodiments, the potential of a rotor is allowed to float. The electrical connections and charging patterns provided herein are exemplary and not limiting.

In addition to advantages of a mechanical nature there are other advantages of the rod/tube geometry. As described in Alston's book on high voltage technology, the voltage-holding ability between rods with a circular cross-section is enhanced over what it would be if the electrodes were planar. From the data presented in Alston, at a gap of 0.5 mm, the breakdown voltage between two electrodes having a radius of curvature of 6 mm is about 60 kilovolts, compared with the breakdown voltage of 45 kilovolts between two near-planar surfaces. Since the power output of an electrostatic generator varies as the square of its operating voltage, the ratio of powers for this example would be 16/9, i.e., 167 percent.

A computer code has been written to calculate the capacity maximum for the structure shown in FIG. 1. Calculations were performed with this code for a set of dimensions appropriate for a 5 KWh flywheel rotor fabricated from E-glass fiber composite. The flywheel rotor inner radius was 0.225 meters, and the inner radius of the array of rotating rods (or, e.g., tubes) was taken to be 0.10 meters, so that their length was 0.1.25 meters. The diameter of the rods (or tubes) was 10 mm. At the inner edge of each layer of rods/tubes the spacing between adjacent rods was also taken to be 10 mm, so that there were 31 rods in each layer. The number of vertical cell layers was then equal to 11. The total rod/cell count was 713. With these parameters the code predicted a maximum capacity value of 0.00134 mfd. The maximum rotation speed of the flywheel rotor was 20,000 RPM so that the output frequency of the generator, being the product of the number of rods/tubes per layer multiplied by the revolutions per second of the rotor, was approximately 1.0 kHz. When these two numbers were introduced into our electrostatic generator code, the predicted output power was 5 kW at a conservative voltage-per-gap of 20 kilovolts. For bulk storage applications, this level of power is more than adequate for a 5 kWh storage module. The predicted efficiency of the generator itself was 0.99, not counting the (typically small) losses in the rectifiers and inverter required to produce 60 Hz output.

The description of the invention up to this point has assumed that each one of the rods/tubes of the generator/motor is made of metal. There could be cases where it would be advantageous for mechanical or electrical reasons to replace the metallic rod/tube rotating arrays by rods/tubes made of a dielectric material, such as is the case in examples in U.S. patent application Ser. No. 11/932,329, incorporated herein by reference. Similar calculations could be performed for such cases, which by their nature would yield somewhat lower maximum capacity values. Another variation on this theme would be to use metallic rods/tubes but to cover either the rotating arrays or the stationary arrays (or both) with a layer of insulating material. The presence of such coatings could have the effect of increasing the voltage-breakdown limit of the system. At typical thicknesses of such layers, their presence should have a minimal effect on the capacity maximum of the system.

Figure 3:
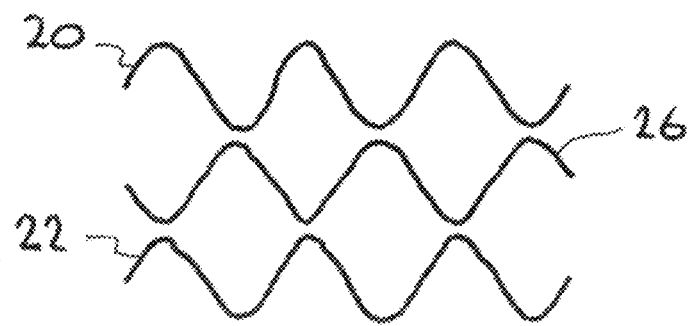
FIG. 3 shows a side view of a portion of a rotating capacitor formed of corrugated metal sheets in the position of maximum capacity.
Figure 4:
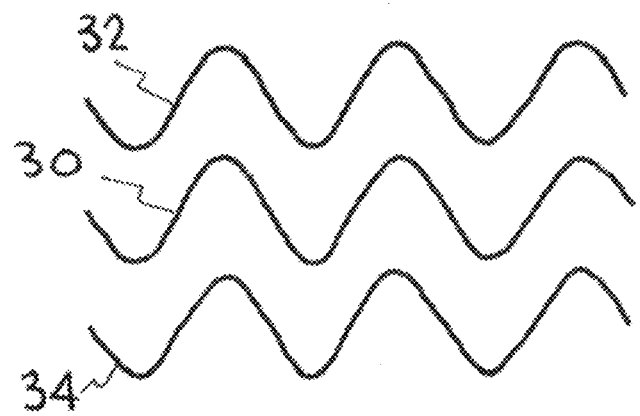
FIG. 4 shows a side view of a portion of a rotating capacitor formed of corrugated metal sheets in the position of minimum capacity.

An alternate way to construct a condenser characterized by curved surfaces moving with respect to one another is to form corrugated surfaces of thin annular discs made of, e.g., stainless steel sheet. These discs are assembled to form the condenser by stacking alternating layers of stationary and rotating discs. FIG. 3 shows one cell of such an array, in the position of maximum capacity between the upper stationary disc 20 and the lower stationary disc 22 and the rotating disc 26 between them. FIG. 4 shows the rotating disc 30 displaced in phase to the position of minimum capacity, with respect to upper stationary disc 32 and lower stationary disc 34. The capacities and capacity ratios can be calculated in the same way that the capacities of the rod system were calculated.

Some embodiments of this invention mount the components of an electrostatic generator on a support surface that is in contact with the inner surface of the flywheel rotor which expands outwardly as a result of centrifugal forces. The support system must be capable of accommodating to this expansion without subjecting the supported elements to azimuthal tensile forces that could rupture them and without materially affecting the balance of the rotor.

Figure 5:
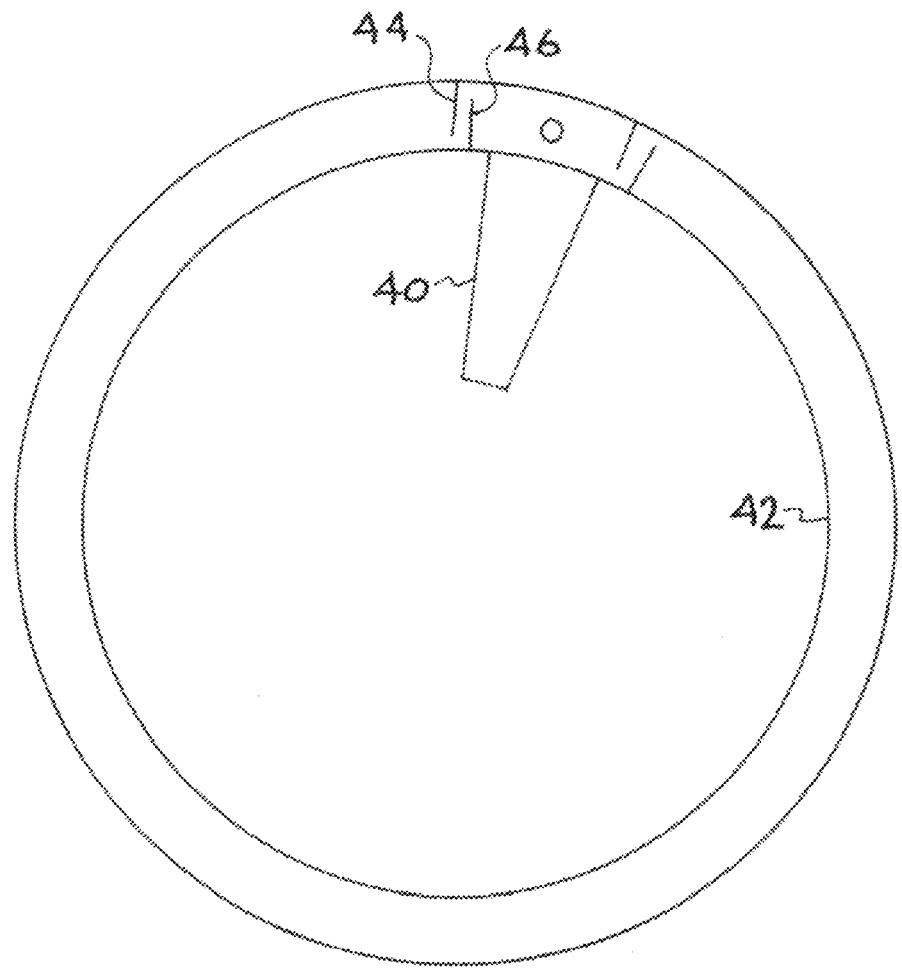
FIG. 5 shows a slotted clamping ring and a sector of a supported element.

As shown in FIG. 5, the concept involves two specific design features. The first of these is to separate the supported elements into a number of pie-shaped sectors, as exemplified by the single element 40, so that no hoop tension can develop within the array as the flywheel rotates. In order to form the entire array these sectors are then attached at their outer edges to a support 42 (e.g., clamped between two clamping rings) that is in supported radially by the inner surface of the flywheel rotor. This support is partially cut through, one cut 44 from the outside in, and the second adjacent cut 46 from the inside out, at azimuthal positions corresponding to the edges of the sectors that are supported. In this way the support is able to expand radially while still supporting the sectors in a way that allows only radially directed forces to be exerted on them so that there is no need for the sectors to expand azimuthally in order to accommodate to the increasing inner circumference of the flywheel rotor or the clamping rings. In actual practice, the calculated increase in radius of a typical flywheel rotor would be of the order of a centimeter or two. If the number of sectors is sufficiently large, the flexing of the stress-relieving cuts in the clamping rings would be small enough to avoid failure of the bridging strips from metal fatigue.

If the stress-relieving cuts are all made with the same depth and spacing, the expansion of the support (e.g., clamping rings) will not appreciably effect the rotor balance as it speeds up, since the radial displacement of each of the sector regions will then be closely the same. In the case of the elements of the passive magnetic bearing, expansion of the rotor will lead to the appearance of a small gap between adjacent sectors. Since there will be many sectors involved these gaps will be very small and should have a negligible influence on the performance of the bearing element. A similar comment applies to the sectors of the electrostatic generator/motor assembly.

Some embodiments of the invention further include techniques for increasing voltage gradient breakdown limits between conductors in a vacuum. Examples usable in the present invention follow a preliminary discussion.

There are many situations in high-voltage electrical technology where it is important to operate in vacuo at very high electric field gradients. The limits on the field gradient are imposed by the need to avoid electrical breakdown between the conducting surfaces. Improved means for increasing the ability of charged electrodes in a vacuum to withstand higher voltages between them is provided. The new concepts described are based on an older concept—"magnetic insulation"—but employ new embodiments of electrodes and magnetic fields with special shaping of both the electrode surfaces and the magnetic field lines. They also involve new applications of the concept that can act to enhance the performance of high-voltage electrical machinery.

In vacuo, the electrical breakdown process can be described as a self-perpetuating avalanche of counter-flowing electrons and ions between the two conducting surfaces across which the electrical gradient occurs. A simplified description of such an avalanche is the following: In the presence of the high field gradient, an ion may be released from the positively charged surface. This ion will then be accelerated by the field gradient and will subsequently impact the negatively charged electrode, releasing secondary electrons. These electrons will then be accelerated back across the gap, impacting the positively charged electrode, releasing more ions, and thus giving rise to a cascade of counter-flowing electrons and ions, i.e., to electrical breakdown.

As is well known, in the presence of a sufficiently strong magnetic field parallel to the surface of the negatively charged electrode (from which the electrons are emitted in an avalanching electrical discharge in a vacuum), any electrons leaving the surface will have their orbits turned back toward the surface, thus preventing the development of an avalanching electrical breakdown. The equation describing this effect, called the "magnetron cutoff equation," has the form given in Equation 1.

$$V_{crit} = \frac{1}{2}\left(\frac{q_e}{m_e}\right)^2 (B \cdot S)^2 \text{ Volts} \tag{3}$$

Here $q_e$=electronic charge, Coulombs, $m_e$=mass of the electron, kilograms. The strength of the magnetic field is B (Tesla), and the inter-electrode gap=s (meters).

Figure 6:
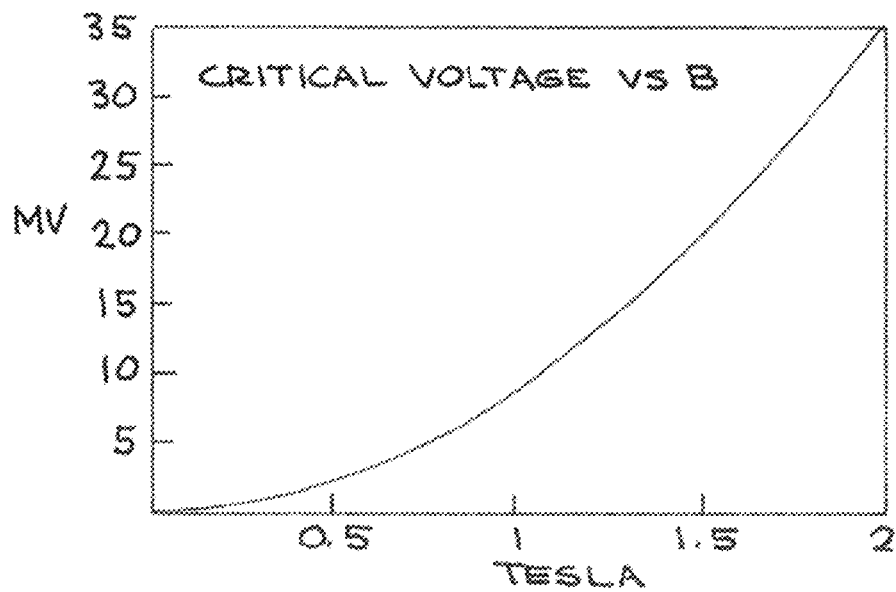
FIG. 6 is a plot of Critical voltage vs magnetic field as calculated from Equation 3, for a gap of 10.0 mm.

FIG. 6 shows a plot of this critical voltage (in MV) vs B(Tesla), as calculated from Equation 3, for the case where s=10.0 mm.

Figure 7:
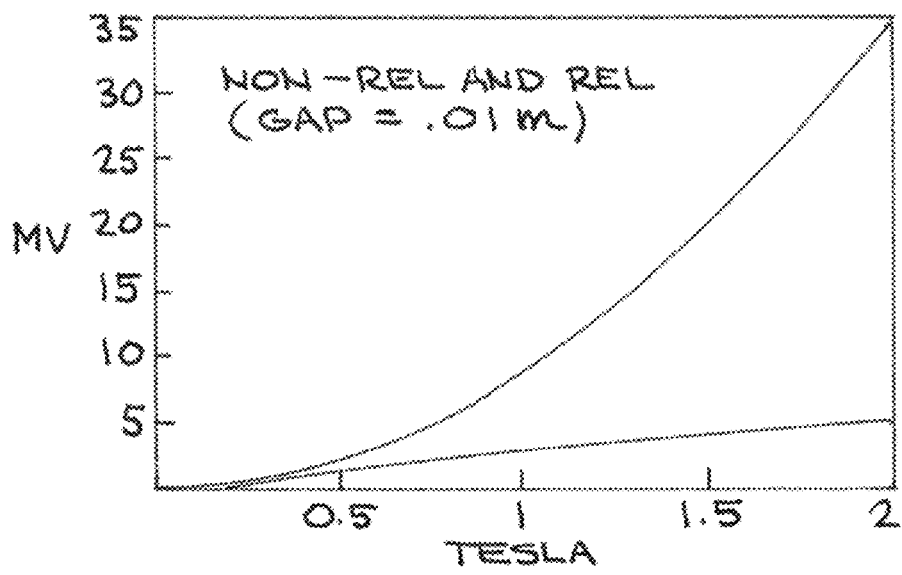
FIG. 7 shows comparison plots for the non-relativistic magnetron cutoff equation (upper plot) and the relativistic form of the magnetron cutoff equation (lower curve).

As can be seen, at magnetic fields larger than about 0.5 Tesla the critical voltage is in excess of 1.0 million Volts. Since the energy-equivalent of the rest mass of the electron is 0.511 MeV, from FIG. 6 it can be inferred that it is necessary to consider relativistic effects in calculating the critical voltage at magnetic fields in excess of about 0.3 Tesla. A relativistic formulation of the cutoff condition has been made in order to determine the magnitude of the correction to the non-relativistic Equation 3. FIG. 7 compares the results shown in FIG. 6 (upper curve) with those obtained from the relativistic formulation.

Although the cutoff values calculated from the relativistic formulation of the magnetron cutoff equation are substantially lower than the non-relativistic values, they are still very high at fields of order 1 Tesla or greater. Specifically, holding off electric potentials of order 5 million volts over a gap of 10 millimeters, corresponding to a gradient of 500 million volts per meter, is substantially in excess of the breakdown gradients typical of those encountered with vacuum-insulated electrodes in the absence of a magnetic field. Some novel embodiments of magnetic insulation are discussed infra.

There are situations where it is required to suppress electrical breakdown in vacuum between conducting surfaces the dimensions of which are large enough to make it difficult to employ the concept of magnetic insulation. An example of the use of magnetic insulation is the use of external magnet coils to create strong magnetic fields the field lines of which are everywhere parallel to the conducting surfaces, as required in order to take advantage of the magnetron-cutoff effect. Ideally, much would be gained if the desired result could be obtained by using permanent-magnet elements to create the required magnetic field. The problem to be solved in this case is how to create a situation where the field lines produced by the permanent magnets have essentially the same geometrical configuration as the conducting surface. This problem can be solved in the following way: First, the conducting surface is accordion-like in that it is formed with a periodic wave-like pattern of ridges and troughs. Second, the magnetic blocks of Halbach arrays are nested into the back surface of the conductor. By design the magnetic field lines of the Halbach arrays are made to conform (except at the bottom of the troughs) to the rippled conductor surface. The electric field that exists at the conductor surface has its maximum values at the peak of the ridges, falling to much smaller values at the bottoms of the troughs. In this way all parts of the conducting surface that are exposed to high electric fields because of the presence of oppositely charged adjacent conducting surfaces will be able to take advantage of the magnetron-cutoff suppression of electrical breakdown.

Figure 8:
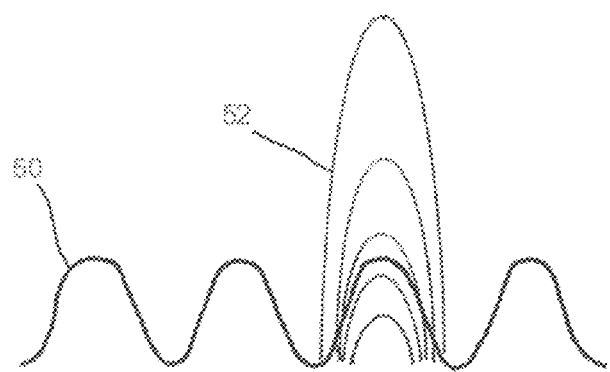
FIG. 8 illustrates a portion of the edge of a rippled conductor surface with superposed plot of magnetic field lines of a Halbach array located below the surface of the conductor.

FIG. 8 illustrates the situation described above, as depicted by a rippled conducting surface 50 plotted together with the calculated field lines 52 from a Halbach array located at the back surface of the conductor.

Using this technique localized magnetic fields with field lines nearly parallel to the conducting surface (except at the bottoms of the trough, where the electric field is much smaller than at the ridges) are created. Approximate calculations based on the use of the relativistic magnetron-cutoff equation indicate that electric potentials of one million volts or more could be sustained between two closely spaced large-area conducting surfaces when high-field (e.g., NdFeB) permanent magnets are used in the Halbach arrays behind the surfaces.

Among the possible applications of the above-described concept are its use in particle accelerators and in HCDC transmission lines.

Figure 9A:
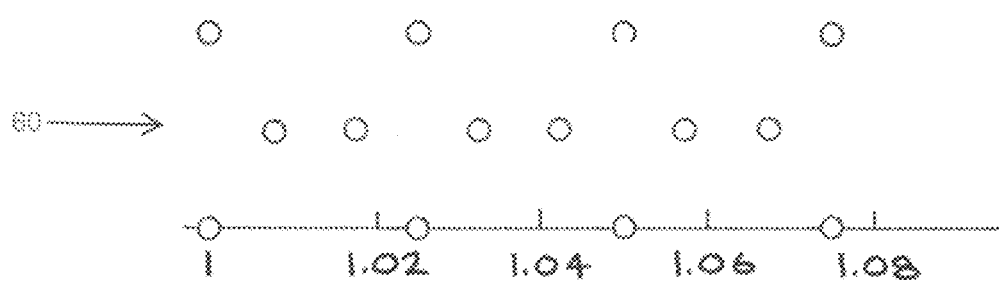
FIG. 9A shows a cross-section of a conductor array that simulates a Halbach array.
Figure 10:
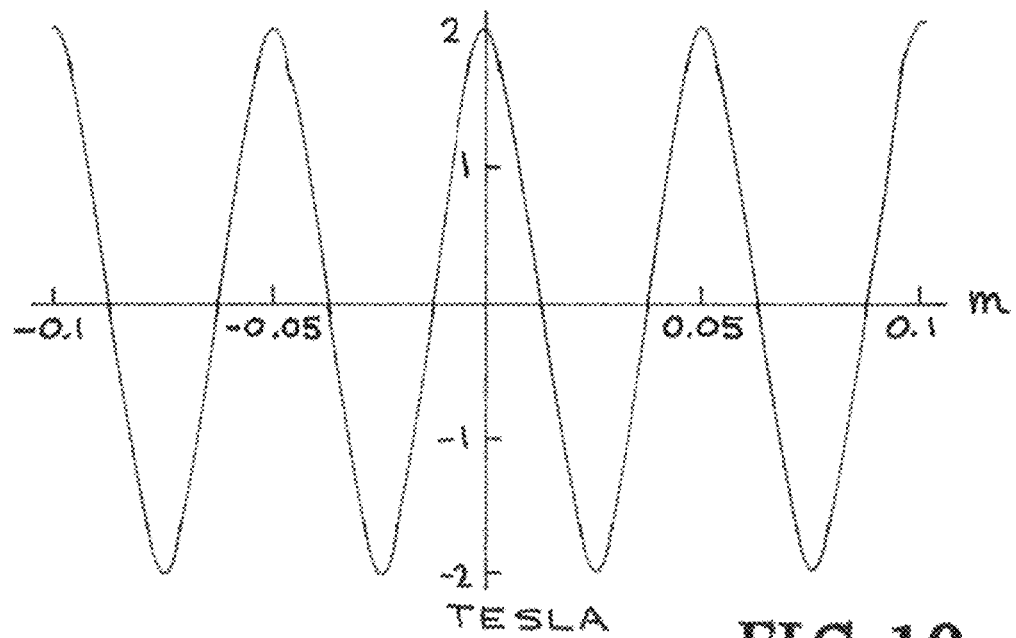
FIG. 10 shows a plot of one component of magnetic field produced by the conductor array shown in FIG. 9A.

U.S. patent application Ser. No. 11/932,329 titled "An Improved Electrostatic Generator/Motor," as well as the present disclosure have described new configurations of electrostatic generators that opens up new possibilities for this type of generator. In employing this new configuration to generate output voltages and powers at the levels needed for HVDC transmission, the electric fields between the rotating and stationary components of these generators may become very high, i.e., of order millions of volts per centimeter. In order to operate successfully at such voltages it would be highly advantageous to employ the magnetic insulation concept in the generator. Again, the requirement is that the magnetic field lines needed to achieve magnetic insulation must be directed parallel to the conducting surfaces. Since these surfaces are disc-like in the generators of U.S. patent application Ser. No. 11/932,329, this means that the magnetic field must have only radial or azimuthal components. An example method for creating strong fields having only azimuthal or radial components at the generator electrodes is provided when the magnetic field from a DC current in a cylindrical array of superconductors is located near the axis of rotation of the generator. For example, a total current of 2.5 mega-mperes flowing in such an array of longitudinal conductors will produce a magnetic field of 1.0 Tesla at a radial distance of 0.5 meters from the axis. FIG. 7 shows that the relativistic magnetron-cutoff equation predicts that a potential of about 2.5 million volts could be maintained between adjacent planar conductors in the presence of such a magnetic field. Another example method for creating strong fields having only azimuthal or radial components at the generator electrodes is provided when the magnetic field from an exterior Halbach array-like magnetic field is produced by an array of axially oriented pairs of conductors each pair of which produces a dipole field approximating that produced by a single block of permanent-magnet material. FIG. 9A shows an example of such an array of conductors 60, and FIG. 10 shows a plot of one component of the field, together with the equivalent $B_{remanent}$ associated with that array.

Figure 9B:
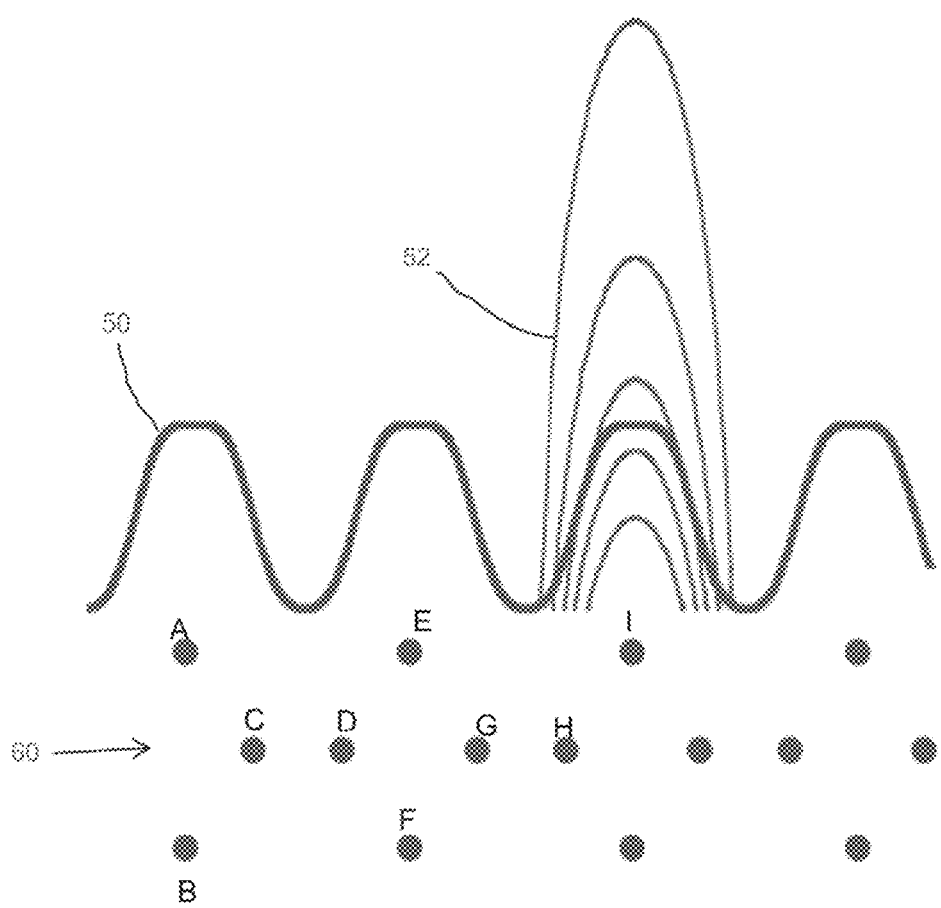
FIG. 9B shows the section of a conductor array of FIG. 9A aligned with the rippled conductor surface of FIG. 8.

FIG. 9B shows the section of a conductor array 60 of FIG. 9A aligned with the rippled conductor surface 50 of FIG. 8. The conductor array 60 is oriented as shown with respect to rippled conductor surface 50 to achieve the correct alignment of the calculated field lines 52 with the rippled surface 50. For axially oriented conductors only radial and azimuthal field components will be generated. The wavelength of the Halbach array (four periods of the conductor array) can be chosen so as to produce the desired level of field at the generator electrodes. One embodiment, as discussed below, consists of a rippled disc where the ripples extend outwardly from a central axis of rotation. FIG. 9B shows the outer edge of a section of such a disc. It shows the outer edge as if it were flat; however, in reality the ripples are located all the way around the outer edge of the disc and extend toward the central axis of rotation. The ripples usually would not extend all the way to the central axis because the wavelength of each ripple would get shorter and shorter the closer to the axis that the ripples get. Notice that the flux lines 52 are aligned with a peak of the rippled conductor surface 50. The configuration of conductors in the conductor arrays are set up so the current flows in each wire in such a way that the flux lines are produced. As an example, using the "right hand rule" as is known in the art, if the system is set up so that the current flows in the wire labeled A in a direction perpendicularly outward from the page, then the sequence of current directions, relative to the plane of the page, for the wires that follow would be as follows: B flows in, C flows out, D flows in, F lows out, G flows in and H flows out. Notice that the direction of flow for each of wires A through D is opposite to the direction of each of wires E through H. Wire I would continue the sequence and would have a direction opposite to that of wire E. The sequence would continue around the conductor array. This sets up a series of dipoles that produce the field lines as illustrated over one peak in FIG. 9B. The actual wiring of the array to a current source to produce the relative current directions is within the skill of the art. It is possible to use a single wire that snakes through the entire system, or multiple wires can be used. Under certain design conditions, it may be desirable to provide cooling for the conductor array.

Figure 9C:
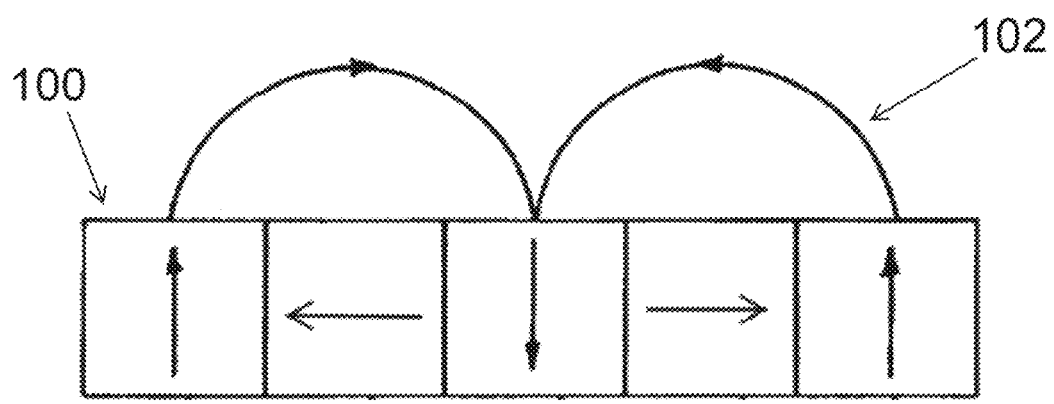
FIG. 9C shows a section of a Halbach array and the direction of the field lines produced by such an array.
Figure 9D:
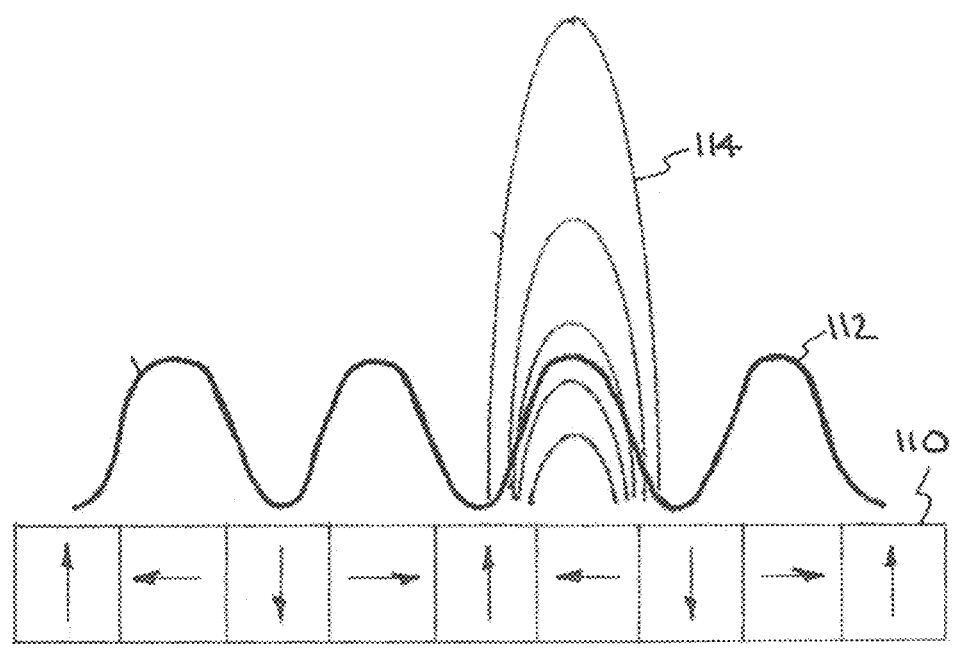
FIG. 9D shows a section of a Halbach array of FIG. 9A aligned with a rippled conductor surface.

FIG. 9C shows a Halbach array section 100 and the direction of the field lines 102 produced by such an array. A rippled such as disc 50 of FIG. 9B would be aligned with the Halbach array section 100 so that the field lines 102 would be over each ripple peak. FIG. 9D shows a Halbach array section 110 properly aligned with the rippled disc 112 and further shows the field lines 114.

Figure 9E:
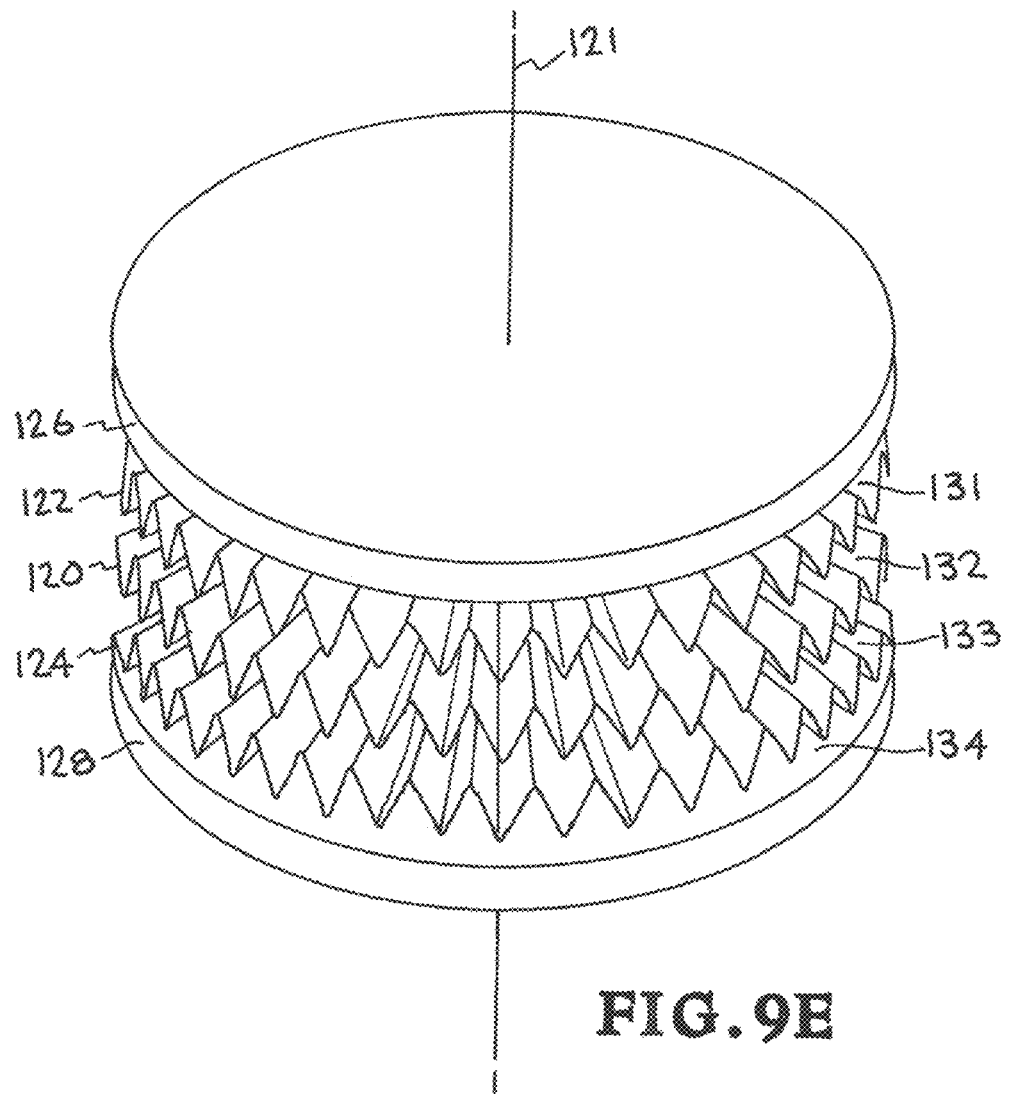
FIG. 9E shows a full system utilizing a central rippled rotor and two outer rippled stators and further shows outer sections for either Halbach arrays or conductor arrays.
Figure 11A:
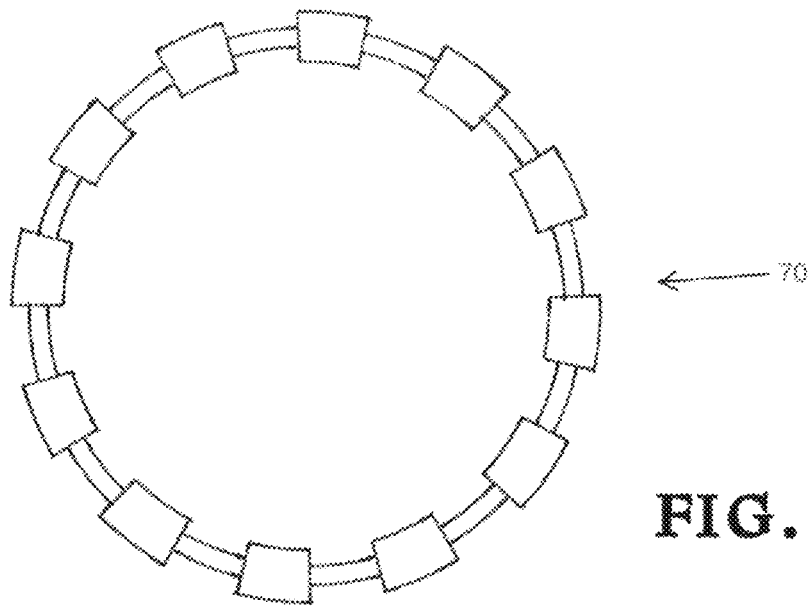
FIG. 11A shows an end view of an embodiment of nested metallic cylinder.

FIG. 9E shows a full system utilizing a central rippled disc rotor 120 and two outer rippled stators 122 and 124 all located on a common central axis 121 and further shows outer sections 126 and 128 for either Halbach arrays or conductor arrays. The outer sections 126 and 128 are either conductor arrays as in FIG. 9B or are Halbach arrays as in FIGS. 9C and 9D. The Halbach array or conductor array of outer section 126 is oriented so its field lines propagate in the direction of stator 122. The Halbach array or conductor array of outer section 128 is oriented so its field lines propagate in the direction of stator 124. Thus, the field lines of each outer section are directed toward their adjacent stator. The gaps 131-134 are not shown to scale. It is desirable that their separation is set to produce a desired output voltage. One application of the embodiment of FIG. 9E is to generate high AC potential the output of which would be rectified and sent into a high voltage transmission line. Although the concept of the embodiment of FIG. 9E is scalable, one embodiment has disc diameters on the order of 5 feet. The wiring of this as either an electrostatic generator or motor can be similar to that as described in U.S. patent application Ser. No. 13/796, 678, incorporated herein by reference. See FIG. 11A of that application. The principles of parametric resonance, as described in this and other incorporated disclosure, can be employed with the embodiments of this invention.

A technique for magnetic insulation of charged conductors in vacuo includes a means for producing the insulating effect over a large area of conductor surface without the need for generating the fields by using conventional magnet coils. These would necessarily have to be of large size and would require large currents to create the required fields. Furthermore, unless the high-voltage conductor configuration has a geometry that is consistent with the field-line direction of the magnetic field (i.e., one where the field lines at the surface of the conductor lie parallel to the surface) no coil configuration would be able to produce the necessary field. The invention consists of shaping the surface of the charged conductors to correspond as closely as possible to the field configuration that is generated by a Halbach array located at the backside of the charged conductor surface where breakdown is to be avoided.

Another technique for magnetic insulation of charged conductors in vacuo is aimed at the objective of enhancing the performance of the new breed of electrostatic generator/motor described in U.S. patent application Ser. No. 11/932, 329 titled "An Improved Electrostatic Generator/Motor," filed Oct. 31, 2007, incorporated herein by reference. Here several possible ways of generating the required magnetic fields are provided. The invention thus consists of combining the new E-S generator/motor configuration with means to employ magnetic insulation in order to increase the voltage levels at which the generator/motor can operate.

An alternate geometrical configuration improves voltage breakdown suppression while at the same time simplifying the magnet coil system that generates the magnetic field.

Figure 11B:
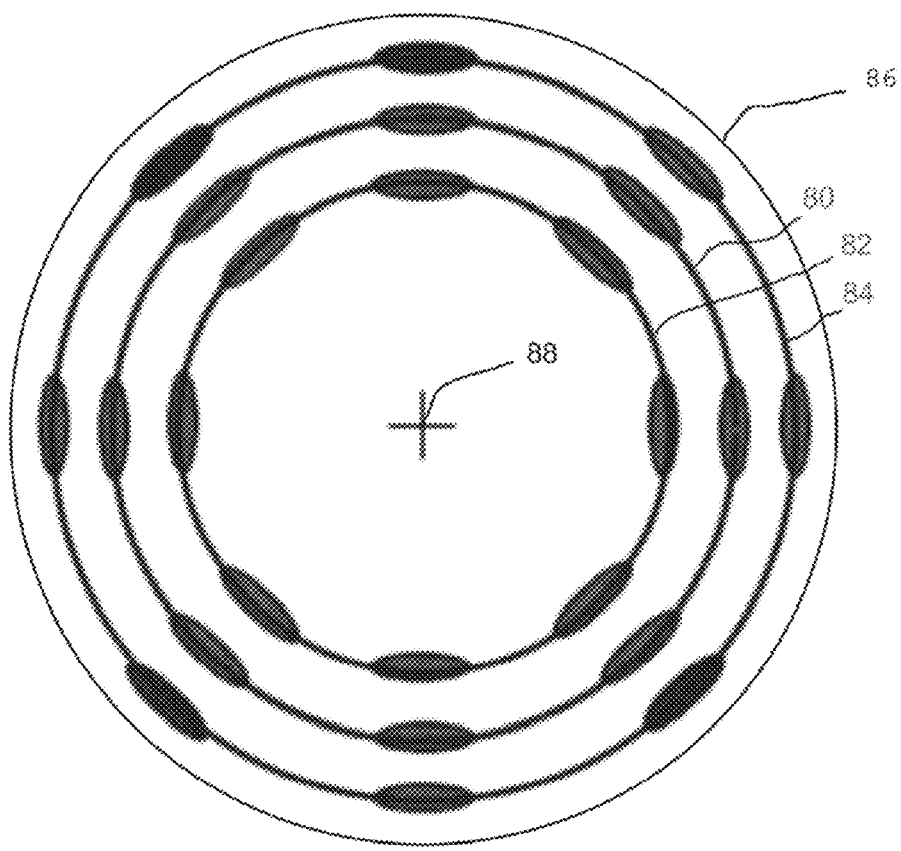
FIG. 11B shows an end view of an embodiment of nested metallic cylinder.

One embodiment consists of nested metallic cylinders, divided into stationary and rotating ones. The cylinder groups are cantilevered from support structures at their ends. Both the rotating group and the stationary group consist of cylinders the thickness of which varies periodically with azimuth. An end view of such a cylinder 70 is shown schematically in FIG. 11A. FIG. 11B shows an end view of an embodiment with a rotor 80, an inner stator 82 and an outer stator 84. The larger and smaller parts of the cylinders shown in FIGS. 11A and 11B can be formed, e.g., from a single metal cylinder. In an actual embodiment, the corners of the thick lands can be rounded to avoid field-enhancement effects that occur at sharp edges in charged conductors. FIG. 11B illustrates an embodiment having rounded corners.

Outside and inside of each of the above-described rotating cylinders are stationary cylinders the thickness of which varies with the same periodicity as that of the rotating group. Thus, considering a typical group of three of the cylinders, the inner and outer cylinders would be stationary while the one between them would be rotating. As this middle cylinder rotates its thickened portions would alternately become aligned with the thickened portions of the stationary cylinders lying just inside and just outside it (the azimuthal position of maximum capacity), or they would be aligned with the thinner portions of the stationary cylinders (minimum capacity). In another embodiment, the rotating cylinder would be made of dielectric material, rather than metal. The entire assembly would consist of a number of concentric cells of the type described, except that it should be noted that the inner, stationary cylinder of one such cell would also be the outer stationary element of the cell inside the given cell, and vice versa. In a high-power generator/motor, several such concentric cells can be employed.

Electrically, if they are made of conducting material, the rotating cylinders would be grounded electrically (either capacitively or with electrical brushes), while the stationary cells would be charged positively or negatively. The result would therefore be to create a set of two time-varying capacitors having common grounded electrodes. If desired, the azimuthal orientation of alternate sets of the stationary cylinders could be displaced in phase relative to each other, for example by 180 degrees, thus displacing the maximum and minimum capacity values of the capacitor pairs by half a period.

The capacitor geometry just described has been chosen specifically in order to use strong magnetic fields whose direction is tangent to the conducting surfaces of all the capacitor electrodes in order to greatly increase the inter-electrode breakdown voltage. In the case described for FIG. 11B, a solenoid coil 86 (shown in end view) that is coaxial with the axis 88 of the generator/motor can generate the required magnetic field. The solenoid coil would typically be located outside the vacuum enclosure. Note that if superconducting coils are employed, they might be located inside the chamber to facilitate the implementation of the required cryogenics.

In these embodiments, it would be relatively straightforward to maintain magnetic fields of 2 Tesla or more within the generator/motor. In such cases the inter-electrode gaps at their minimum points (i.e., when the thickened portions of both the rotating and the stationary cylinders are aligned azimuthally) could be quite small, even when the potentials were very high, e.g., 500 kV, as appropriate for HVDC power transmission.

Figure 12:
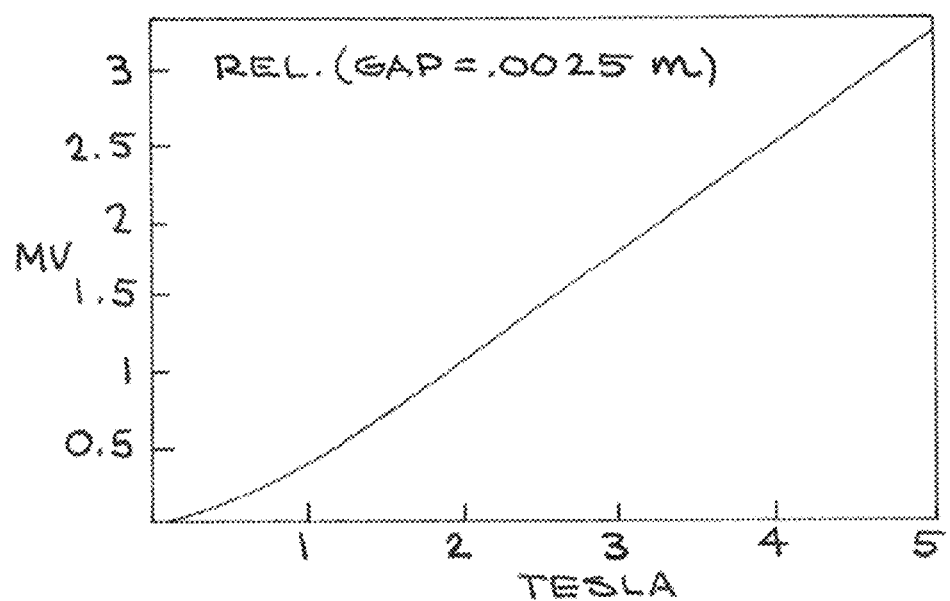
FIG. 12 shows a plot of the relativistic magnetron cutoff voltage as a function of magnetic field, for the case of a gap of 2.5 mm.

As an example, FIG. 12 shows a plot of the relativistic magnetron cutoff voltage as a function of magnetic field, for the case of a gap of 2.5 mm. As can be seen from the plot, at a field of 2.0 Tesla. the cutoff voltage is approximately 1.0 MV.

As suggested by the numbers above, this new electrostatic generator/motor configuration can be designed to deliver its power at voltages appropriate to HVDC transmission. Thus the AC output of the generator, typically delivered at kilohertz frequencies, would be rectified using solid-state rectifier stacks, to produce a HVDC output at power levels of order tens or hundreds of megawatts. This output could then be directly connected to a HVDC transmission line, with no need for transformer banks at the power station.

In addition to the use of the above-described system as a generator, the same configuration could be operated as a motor. This new electrostatic motor could replace high-horsepower electric motors of the conventional electromagnetic type (e.g., induction motors) by a motor efficiency of which could be substantially higher than that of conventional motors. In an electrostatic motor, the efficiency of the motor itself approaches 100 percent, so that the only significant source of inefficiency would be that associated with the power electronics required to drive it. Using modern solid-state components, the conversion efficiencies (from 60 Hz AC or DV to motor frequencies) can be very high.

In summary, some embodiments of the present invention include a new configuration for an electrostatic generator/motor that uses simple solenoidal coils to generate a strong magnetic field the field lines of which are directed parallel to the surface of the electrodes of the E-S generator/motor. These configurations provide a better means to implement the magnetic suppression of electrical breakdown between the rotating and stationary elements of the generator/motor, even at potentials of order 500 kV, as typical of those used in HVDC transmission line systems.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
a central axis;
a rippled disc shaped first rotor having its center located on said central axis, wherein the average plane of said rotor is perpendicular to said central axis, wherein said rotor is rotatable around said central axis;
a rippled disc shaped first stator having is center located on said central axis, wherein the average plane of said first stator is perpendicular to said central axis and parallel with said rotor;
a rippled disc shaped second stator having is center located on said central axis, wherein the average plane of said second stator is perpendicular to said central axis and parallel with the average plane of said rotor, wherein said rotor is located between said first stator and said second stator; and means for providing a magnetic field comprising field lines that conform to the curvature of the rippled shape of at least one of said first stator or said second stator.

2. The apparatus of claim 1, wherein said means for providing a magnetic field comprises at least one Halbach array.

3. The apparatus of claim 2, wherein a first Halbach array of said at least one Halbach array is parallel with the average plane of said first stator and is on the side of said first stator opposite of said first rotor.

4. The apparatus of claim 3, wherein a second Halbach array of said at least one Halbach array is parallel with the average plane of said second stator and is on the side of said second stator opposite of said first rotor.

5. The apparatus of claim 1, wherein said means for providing a magnetic field comprises at least one conductor array.

6. The apparatus of claim 5, wherein a first conductor array of said at least one conductor array is parallel with the average plane of said first stator and is on the side of said first stator opposite of said first rotor.

7. The apparatus of claim 6, wherein a second conductor array of said at least one conductor array is parallel with the average plane of said second stator and is on the side of said second stator opposite of said first rotor.

8. The apparatus of claim 1, wherein said first stator, said second stator and said first rotor each comprise electrically conductive material, said apparatus further comprising means for positively or negatively charging said first stator and said second stator, said apparatus further comprising means for electrically grounding said first rotor.

9. The apparatus of claim 1, wherein said magnetic field is at a maximum at positions of said first stator or said second stator that are furthest from said means for providing a magnetic field.

10. The apparatus of claim 9, wherein said magnetic field comprises a component that is parallel with the curvature of said positions of said first stator or said second stator that are furthest from said means for providing a magnetic field.

11. The apparatus of claim 1, wherein the combination of said first stator, said first rotor and said second stator defines a first configuration, the apparatus further comprising at least a second configuration having its center located on said axis.

12. A method utilizing the apparatus of claim 1, the method comprising:
rotating said rippled disc shaped first rotor and said rippled disc shaped second stator about said central axis; and
providing said magnetic field such that its field lines comprise components that conform to the curvature of the rippled shape of at least one of said first rotor or said second stator.

13. The method of claim 12, wherein said magnetic field is provided by at least one Halbach array.

14. The method of claim 12, wherein said magnetic field is provided by at least one conductor array.

15. The method of claim 12, wherein said first stator, said second stator and said first rotor each comprise electrically conductive material, the method further comprising positively or negatively charging said first stator and said second stator, and electrically grounding said first rotor.

16. The method of claim 12, wherein the combination of said first stator, said first rotor and said second stator defines a first configuration, the method further comprising providing and operating at least a second configuration located on said central axis.

17. The method of claim 12, wherein said magnetic field is at a maximum at positions of said first stator or said second stator that are furthest from said means for providing a magnetic field.

18. The method of claim 17, wherein said magnetic field comprises a component that is parallel with the curvature of said positions of said first stator or said second stator that are furthest from said means for providing a magnetic field.

* * * * *